(12) United States Patent
Oh et al.

(10) Patent No.: US 11,581,560 B2
(45) Date of Patent: Feb. 14, 2023

(54) POLYMER ELECTROLYTE MEMBRANE FOR FUEL CELL AND METHOD OF MANUFACTURING SAME

(71) Applicants: Hyundai Motor Company, Seoul (KR); Kia Motors Corporation, Seoul (KR)

(72) Inventors: Jongkil Oh, Gyeonggi-do (KR); Bo Ki Hong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 85 days.

(21) Appl. No.: 17/121,224

(22) Filed: Dec. 14, 2020

(65) Prior Publication Data
US 2021/0313610 A1    Oct. 7, 2021

(30) Foreign Application Priority Data
Apr. 7, 2020  (KR) .......................... 10-2020-0042278

(51) Int. Cl.
*H01M 8/1051*   (2016.01)
*H01M 8/1053*   (2016.01)
(Continued)

(52) U.S. Cl.
CPC ....... *H01M 8/1051* (2013.01); *H01M 8/1004* (2013.01); *H01M 8/1053* (2013.01); *H01M 8/1062* (2013.01); *H01M 8/1067* (2013.01); *H01M 8/1086* (2013.01); *H01M 2008/1095* (2013.01); *H01M 2250/20* (2013.01); *H01M 2300/0094* (2013.01)

(58) Field of Classification Search
CPC ............ H01M 8/1051; H01M 8/1004; H01M 8/1053; H01M 8/1062; H01M 8/1067; H01M 8/1086; H01M 2008/1095; H01M 2250/20; H01M 2300/0094
See application file for complete search history.

(56) References Cited

U.S. PATENT DOCUMENTS 6,936,370 B1    8/2005  Knights et al.
2008/0107803 A1*  5/2008  Kwon ................. H01M 8/1004
                                                 427/115
(Continued)

FOREIGN PATENT DOCUMENTS

JP    2008-130394 A    6/2008
JP    2012-094315 A    5/2012
(Continued)

OTHER PUBLICATIONS

A. Kusoglu and A. Z. Weber, Chemical Reviews, 117, 987-1104 (2017).

*Primary Examiner* — James Lee
(74) *Attorney, Agent, or Firm* — Fox Rothschild LLP (57) ABSTRACT

Disclosed are a polymer electrolyte membrane for a fuel cell, a membrane-electrode assembly including the same, a fuel cell and a method of manufacturing the polymer electrolyte membrane for a fuel cell. Particularly, the polymer electrolyte membrane for a fuel cell may include ionomer layers including a voltage reversal tolerance-increasing additive including a water electrolysis catalyst and an electrical conductor and provided on a porous reinforced film.

15 Claims, 4 Drawing Sheets

(51) Int. Cl.
  *H01M 8/1004* (2016.01)
  *H01M 8/1062* (2016.01)
  *H01M 8/1067* (2016.01)
  *H01M 8/1086* (2016.01)
  *H01M 8/10* (2016.01)

(56) References Cited

U.S. PATENT DOCUMENTS

2013/0224522 A1* 8/2013 Maruyama .......... H01M 4/9083
  429/525
2017/0288234 A1* 10/2017 Sharman ............. H01M 4/8892

FOREIGN PATENT DOCUMENTS

| KR | 100682030 B1 | 2/2007 |
| KR | 100902316 B1 | 6/2009 |
| KR | 101082859 B1 | 11/2011 |
| KR | 2017-0001451 A | 1/2017 |
| KR | 101936549 B1 | 1/2019 |

* cited by examiner

: Fuel cell reation region

: Fuel cell non-reation region

: Voltage reversal tolerance-increasing additive distribution region in the fuel cell reaction region

FIG.4

POLYMER ELECTROLYTE MEMBRANE FOR FUEL CELL AND METHOD OF MANUFACTURING SAME

CROSS REFERENCE TO RELATED APPLICATION

The present application claims priority based on Korean Patent Application No. 10-2020-0042278, filed on Apr. 7, 2020, the entire content of which is incorporated herein for all purposes by this reference.

TECHNICAL FIELD

The present invention relates to a polymer electrolyte membrane for a fuel cell, a membrane-electrode assembly including the same, a fuel cell and a method of manufacturing the polymer electrolyte membrane for a fuel cell. In particular, the polymer electrolyte membrane for a fuel cell may include ionomer layers including a voltage reversal tolerance-increasing additive including a water electrolysis catalyst and an electrical conductor and provided on a porous reinforced film.

BACKGROUND

Currently, a polymer electrolyte membrane fuel cell (PEMFC) is most frequently used as a fuel cell for vehicles. Such a polymer electrolyte membrane fuel cell must be able to stably operate over a wide current density range in order to exhibit normal high-output performance of at least tens of kW under various vehicle operating conditions.

The fuel cell is used in the form of a stack in which unit cells are stacked and assembled to meet the required output level. Each unit cell is configured such that a gas diffusion layer (GDL), a gasket, etc. are stacked on the outer portion of a membrane-electrode assembly (MEA), i.e. on the outer portion where the cathode and anode are located, and the outer side of the gas diffusion layer is provided with a bipolar plate (or a separator) having a flow field through which coolant passes and which supplies reactant gases (hydrogen as fuel and oxygen or air as oxidant). After stacking hundreds of such unit cells, an end plate for supporting the unit cells is provided on the outermost side.

An electrochemical reaction for generating electricity for the fuel cell occurs in a membrane-electrode assembly composed of a perfluorinated sulfonic acid (PFSA) ionomer-based electrolyte membrane and an anode and a cathode. In general, electrodes used for fuel cell electric vehicles include a catalyst that causes a fuel cell reaction, a catalyst support, and an ionomer binder that connects the catalyst and the catalyst support to each other. As the catalyst for a fuel cell, expensive platinum (Pt) has been mainly used, and in order to reduce the cost of the stack, alleviate catalyst poisoning by carbon monoxide, etc. or improve the performance of the catalyst, platinum may be alloyed with metal elements such as palladium (Pd), ruthenium (Ru), iridium (Ir), gold (Au), manganese (Mn), iron (Fe), cobalt (Co), nickel (Ni), copper (Cu), yttrium (Y) and the like. The metal catalyst particles are supported on a catalyst support having a high specific surface area in the form of nanoparticles in order to increase the reaction area. Examples of the catalyst support for a fuel cell may include carbonaceous materials having high electrical conductivity, such as carbon black, activated carbon, carbon nanotubes, carbon nanofibers, carbon nanospheres, carbon nanowires, graphite, graphene, mesoporous carbon, and the like. The ionomer binder of the electrode may be mainly perfluorinated sulfonic acid.

As for the electrochemical reaction in the fuel cell, hydrogen supplied to the anode, which is the oxidation electrode of the fuel cell, is separated into protons and electrons through a hydrogen oxidation reaction (HOR), as represented in Scheme [1] below, after which the protons move to the cathode, which is the reduction electrode, via the membrane, and the electrons move to the cathode via an external circuit. At the cathode, the protons and the electrons react with oxygen gas supplied outside through an oxygen reduction reaction (ORR) to generate electricity and heat, and at the same time, water ($H_2O$) is generated as a reaction byproduct, as represented in Scheme [2] below.

Here, $E°$ is a standard electrode potential and SHE is a standard hydrogen electrode.

In particular, when the protons move from the anode to the cathode via the membrane, an electro-osmotic drag (EOD) phenomenon, by which protons are coupled in the form of hydronium ions with water molecules to drag the water molecules, occurs. Moreover, when the amount of water that cumulates at the cathode increases, a back diffusion (BD) phenomenon, by which some water moves backwards from the cathode to the anode, may occur. The water generated and moved through the fuel cell reaction plays a desirable role in maintaining the humidification of the membrane-electrode assembly when present in an appropriate amount. However, when excess water is present, if it is not properly removed, a water flooding problem occurs, and the overflowing water impedes the efficient supply of reactant gases into the fuel cell, resulting in a greater voltage loss. The problem of insufficient supply of hydrogen and oxygen, which are the reactant gases used in the fuel cell, may occur due to various causes such as ice formation in winter and abnormality of a reactant gas supply device, in addition to the water flooding in the fuel cell. In particular, it is known that hydrogen fuel starvation at the anode has a very detrimental effect on the performance of the fuel cell and thus significantly reduces the cell voltage.

Typically, hydrogen starvation may be classified into overall hydrogen starvation, in which hydrogen supply is insufficient throughout the fuel cell, and local hydrogen starvation, in which hydrogen supply is sufficient for the entire cell but is insufficient in portions thereof due to uneven distribution. This hydrogen starvation phenomenon occurs frequently under operating conditions such as uneven supply and distribution of hydrogen gas, sudden increase in fuel cell load demand, and fuel cell start-up. Indeed, overall hydrogen starvation may be relatively easily detected by monitoring the hydrogen supply status using a sensor in a balance of plant for a fuel cell. However, local hydrogen starvation in some cells requires much more effort and a complicated control system because the hydrogen supply status in each cell in the fuel cell stack may be detected only upon close monitoring using a stack voltage monitoring device.

When the hydrogen gas in the anode is insufficient during fuel cell operation, the anode voltage increases in order to generate protons necessary for the fuel cell reaction, and the anode voltage ($E_{An}$) is increased more than the cathode voltage ($E_{Ca}$), thus forming a cell voltage reversal state in which the cell voltage ($E_{Cell}$) becomes less than 0 V ($E_{Cell}=E_{Ca}-E_{An}<0$). For example, carbon, which is a catalyst support constituting the anode, may be oxidized by reacting with water, as represented in Schemes [3] and [4] below, but protons and electrons necessary for the cathode are not sufficiently supplied due to the sluggish reaction rate, and ultimately the anode voltage drastically increases.

$$C+2H_2O \rightarrow CO_2+4H^++4e^- (0.207 \text{ V vs. SHE}) \quad [3]$$

$$C+H_2O \rightarrow CO+2H^++2e^- (0.518 \text{ V vs. SHE}) \quad [4]$$

If vehicles continue to operate without regard thereto, the corrosion of carbon is accelerated, and the metal catalyst particles supported on the catalyst support are lost, resulting in deteriorated fuel cell performance. When the cell voltage reversal condition continues until an excessive voltage reversal state of −2 V or less is reached, the fuel cell may become overheated, so the membrane-electrode assembly and the gas diffusion layer may be damaged. In particular, serious problems in which pin-holes are formed in the membrane-electrode assembly and the cell is electrically shorted may occur, ultimately resulting in cell failure in which fuel cells may no longer operate normally. Hence, it is important to develop fuel cell parts and systems having excellent tolerance to voltage reversal.

As a conventional technique for preventing corrosion of the catalyst support, research has been conducted with the goal of increasing the corrosion resistance of the catalyst by supporting the catalyst on a non-carbon support such as titanium oxide, cerium oxide, niobium oxide, tungsten oxide, titanium carbide, titanium nitride, etc. In this case, however, the main source of generation of protons in the electrode is removed, so protons cannot be produced, and thus the anode voltage is further increased, whereby adjacent parts such as a gas diffusion layer etc. are oxidized or excessive heat generation occurs, so cell damage may become more severe.

In the related arts, a technique for configuring the anode using a hydrogen oxidation reaction catalyst and an oxygen evolution reaction (OER) catalyst has been introduced. For example, a water electrolysis catalyst, in the anode in order to prevent cell damage due to voltage reversal in a fuel cell. Accordingly, the water electrolysis catalyst such as iridium oxide, ruthenium oxide, etc. contained in the anode decomposes water and supplies protons as represented in Scheme [5] below when a voltage reversal occurs, thereby preventing the anode voltage from excessively increasing and suppressing the oxidation of carbon, ultimately preventing cell damage.

$$H_2O \rightarrow \tfrac{1}{2}O_2+2H^++2e^- (1.229 \text{ V vs. SHE}) \quad [5]$$

However, when a voltage reversal occurs, if the water present in the electrode or the water supplied through the humidifying gas from the outside is not properly supplied to the water electrolysis catalyst, the carbon oxidation reaction rapidly increases in order to make up for the insufficient number of protons. Accordingly, the efficient supply of water, which is a reactant, to the water electrolysis catalyst is important, but methods thereof have still not been devised.

Meanwhile, water in the ionomer exists in the form of bound water and free water depending on the intensity of interaction with the sulfonic acid group contained in the ionomer. Unlike bound water, which is coupled with the sulfonic acid group and thus has restricted mobility, free water may move relatively freely within the ionomer.

SUMMARY

In one preferred aspect, provided is a method of preventing an anode voltage from excessively increasing when a voltage reversal occurs.

In one preferred aspect, provided is a method of increasing the voltage reversal tolerance of a fuel cell stack and improving the driving stability of vehicles under various operating conditions.

In one preferred aspect, provided is a method of reducing the costs incurred for increasing the voltage reversal tolerance of a fuel cell stack.

The objectives of the present invention are not limited to the foregoing, and will be able to be clearly understood through the following description and to be realized by the means described in the claims and combinations thereof.

In an aspect, provided is a polymer electrolyte membrane for a fuel cell, and the method may include a porous reinforced film and ionomer layers (e.g., a first ionomer layer and a second ionomer layer) provided on each of opposite surfaces of the porous reinforced film. Preferably, the ionomer layers may include an ionomer and a portion of the ionomer layers may include one or more voltage reversal tolerance-increasing additives, wherein a voltage reversal tolerance-increasing additive comprises 1) one or more water electrolysis catalysts and and 2) one or more electrical conductors. In certain embodiments, the other portion of the ionomer layer may not include a voltage reversal tolerance-increasing additive, for example such other portion of the ionomer layer may contain less than 4, 3, 2, 1, 0.5, 0.025 weight percent or 0 weight percent of a voltage reversal tolerance-increasing additive based on total weight of that portion of the ionomer layer.

In certain preferred embodiments, up to about 5, 10, 20, 30, 40, 50, 60, 70, 80, 90 or 95 weight percent of the ionomers layers may comprise a voltage reversal tolerance-increasing additive, and the balance weight % of the ionomer layers do not include a voltage reversal tolerance-increasing additive, with such weight percents being based on total weight of the ionomer layers. In certain particular embodiments, up to about 20, 30, 40, 50, 60, 70, 80 weight percent of the ionomers layers may comprise a voltage reversal tolerance-increasing additive, and the balance weight % of the ionomer layers do not include a voltage reversal tolerance-increasing additive, with such weight percents being based on total weight of the ionomer layers.

"The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic.

The ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyetheretherketone-based polymer, a polyphenylquinoxaline-based polymer and a polystyrene-based polymer.

The "porous film" as used herein refers to a film type material that includes plurality of shapes of pores (e.g., circular, or non-circular), holes, cavity (e.g., microcavity), labyrinth, channel or the like, whether formed uniformly or without regularity. Exemplary porous film may include pores (e.g., closed or open pores) within a predetermined size within a range from sub-micrometer to micrometer size, which is measured by maximum diameter of the pores.

The porous reinforced film may have a porosity of about 50% to 95%.

The porous reinforced film may have a thickness of about 1 μm to 20 μm.

Each of the ionomer layers may have a thickness of about 3 μm to 50 μm.

The voltage reversal tolerance-increasing additive suitably may be contained in the portion of the ionomer layers provided on either of the opposite surfaces of the porous reinforced film.

An amount of the voltage reversal tolerance-increasing additive may be about 5 parts by weight to 60 parts by weight based on 100 parts by weight of the total amount of the ionomer.

The amount of the water electrolysis catalyst may be about 0.05 parts by weight to 10 parts by weight based on 100 parts by weight of the total amount of the ionomer of the ionomer layer including the voltage reversal tolerance-increasing additive, and the amount of the electrical conductor may be 5 parts by weight to 50 parts by weight based on 100 parts by weight of the ionomer.

The water electrolysis catalyst suitably may be a metal particle or metal oxide for example including one or more selected from the group consisting of ruthenium (Ru), iridium (Ir), chromium (Cr), manganese (Mn), iron (Fe), cobalt (Co), nickel (Ni), copper (Cu), molybdenum (Mo), and yttrium (Y).

The electrical conductor may include one or more selected from the group consisting of carbon nanotubes, carbon nanofibers, carbon nanowires, and carbon black.

The ionomer layer may include a first ionomer layer formed on a first surface of the porous reinforced film and a second ionomer layer formed on a second surface of the porous reinforced film. The first surface may be a portion of the surface of the porous reinforced film and the second surface may be the remaining portion of the surface of the porous reinforced film.

The portion of the ionomer layers including the voltage reversal tolerance-increasing additive may have a through-plane electrical resistivity of less than about 10 Ω·m at a compressive pressure of 0.5 MPa, and the other portion of the ionomer layers not including the voltage reversal tolerance-increasing additive may have a through-plane electrical resistivity of about 10 Ω·m or greater at a compressive pressure of about 0.5 MPa.

In an aspect, provided is a method of manufacturing a membrane-electrode assembly for a fuel cell, and the method may include preparing the polymer electrolyte membrane described herein, and providing an anode and a cathode on respective surfaces of the polymer electrolyte membrane. The anode may be provided and bonded on the portion of the ionomer layers including a voltage reversal tolerance-increasing additive.

Further provided is a membrane-electrode assembly for a fuel cell which is manufactured by the method described herein. Particularly, the other portion of the ionomer layers not including a voltage reversal tolerance-increasing additive may be in contact with a cathode and the portion of the ionomer layers including a voltage reversal tolerance-increasing additive may be in contact with an anode.

In addition, provided is a fuel cell including the membrane-electrode assembly described herein.

In an aspect, provided is a method of manufacturing a polymer electrolyte membrane for a fuel cell, and the method may include forming a first ionomer layer on one surface of a porous reinforced film, forming a second ionomer layer on the remaining surface of the porous reinforced film and performing drying. Each of the ionomer layers may include an ionomer and a voltage reversal tolerance-increasing additive including a water electrolysis catalyst and an electrical conductor.

The one of the first ionomer layer or the second ionomer layer may include voltage reversal tolerance-increasing additive.

An amount of the voltage reversal tolerance-increasing additive may be about 5 parts by weight to 60 parts by weight based on 100 parts by weight of the total amount of the ionomer.

An amount of the water electrolysis catalyst may be about 0.05 parts by weight to 10 parts by weight based on 100 parts by weight of the total amount of the ionomer, and the amount of the electrical conductor may be about 5 parts by weight to 50 parts by weight based on 100 parts by weight of the total amount of the ionomer.

The voltage reversal tolerance-increasing additive may be contained in all or part of the first ionomer layer and/or in the second ionomer.

The drying may be performed at a temperature of about 40° C. to 200° C.

In some aspects, a voltage reversal tolerance-increasing additive may consist essentially of 1) one or more water electrolysis catalysts and 2) one or more electrical conductors.

In some aspects, a voltage reversal tolerance-increasing additive may consist of 1) one or more water electrolysis catalysts and 2) one or more electrical conductors.

Other aspects of the invention are disclosed infra.

According to various exemplary embodiments of the present invention, a water electrolysis catalyst may be introduced into an electrolyte membrane having high free-water content compared to an electrode, making it possible to efficiently supply water to the water electrolysis catalyst to thereby suppress an excessive increase in anode voltage when a voltage reversal occurs.

According to various exemplary embodiments of the present invention, the voltage reversal tolerance of a fuel cell stack can be increased, and the driving stability of vehicles can be improved under various operating conditions.

According to various exemplary embodiments of the present invention, the costs incurred for increasing the voltage reversal tolerance of the fuel cell stack can be reduced, thus generating economic benefits.

The effects of the present invention are not limited to the foregoing, and should be understood to include all effects that can be reasonably anticipated from the following description.

DETAILED DESCRIPTION

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Provided herein, inter alia, are a polymer electrolyte membrane for a fuel cell that may include an ionomer layer including an ionomer, a water electrolysis catalyst and an electrical conductor, and a porous reinforced film, and to a method of manufacturing the same.

Figure 1:
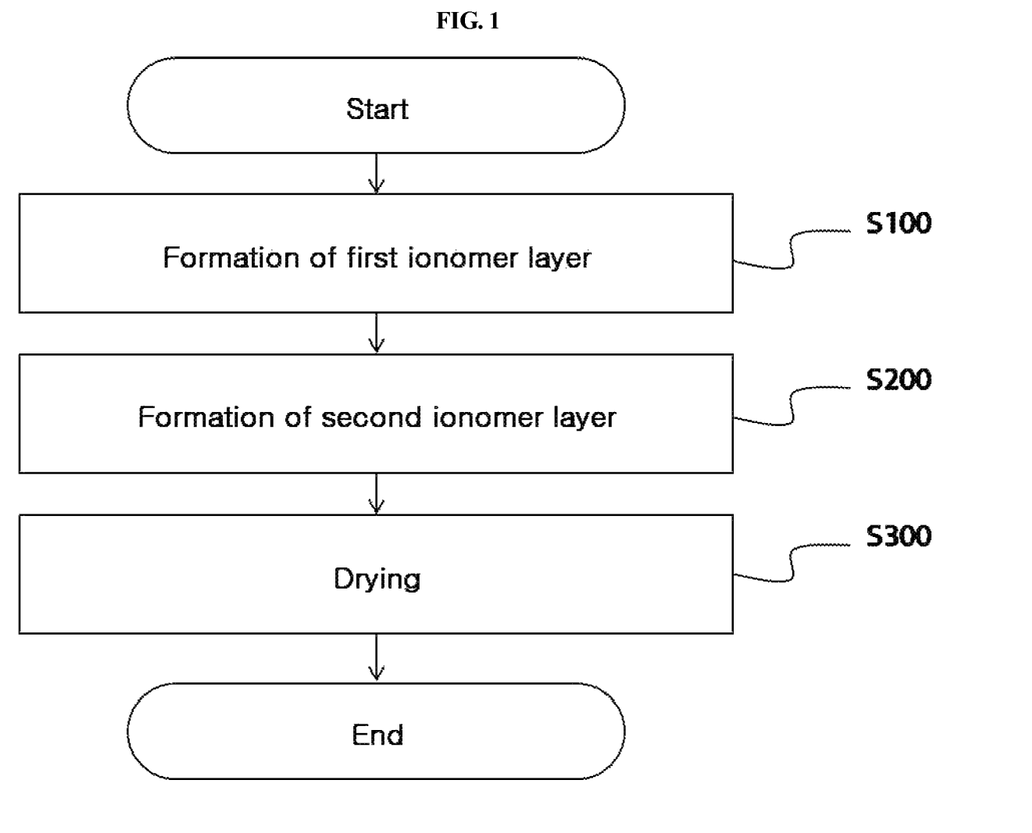
FIG. 1 shows an exemplary process of manufacturing an exemplary polymer electrolyte membrane for an exemplary fuel cell according to an exemplary embodiment of the present invention.
Figure 2:
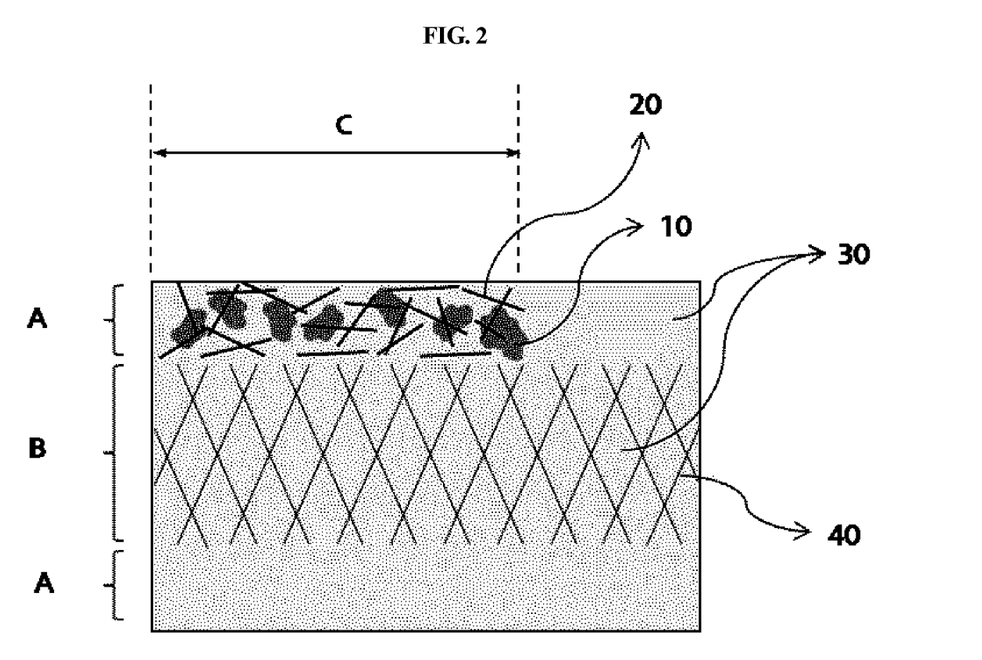
FIG. 2 shows the cross-sectional structure of an exemplary polymer electrolyte membrane for a fuel cell according to an exemplary embodiment of the present invention.

FIG. 1 is a flowchart showing an exemplary process of manufacturing an exemplary polymer electrolyte membrane according to an exemplary embodiment of the present invention, and FIG. 2 shows the cross-sectional structure of an exemplary polymer electrolyte membrane according to an exemplary embodiment of the present invention. As shown in FIG. 1, individual steps of the manufacturing process according to an exemplary embodiment of the present invention are described, and in FIG. 2, an exemplary polymer electrolyte membrane, an exemplary membrane-electrode assembly using the same, and an exemplary fuel cell including the membrane-electrode assembly are described.

Method of Manufacturing Polymer Electrolyte Membrane

The method of manufacturing the polymer electrolyte membrane may include forming a first ionomer layer on one surface of a porous reinforced film, forming a second ionomer layer on the remaining surface of the porous reinforced film, and performing drying. As shown in FIG. 1, individual steps are described below.

Formation of First Ionomer Layer

A first ionomer layer is formed on one surface of a porous reinforced film. Particularly, a first ionomer layer may be formed on one surface of a porous reinforced film using an ionomer dispersion, and preferably, an ionomer dispersion may be applied on a substrate film and a porous reinforced film may be stacked on the applied ionomer dispersion, thereby forming a first ionomer layer on one surface of the porous reinforced film. The substrate film on which the ionomer dispersion is applied may be a release sheet, and the like, and the present invention is not particularly limited with regard thereto.

The ionomer dispersion may include an ionomer and a solvent.

The ionomer as used herein may provide a path that is able to move protons in the electrolyte membrane, and may include a perfluorinated sulfonic acid (PFSA)-based ionomer or a hydrocarbon-based ionomer.

The solvent may preferably be selected so as to uniformly disperse the ionomer in a powder form, and may include one or more alcohol solvents selected from the group consisting of isopropyl alcohol, normal propyl alcohol and ethyl alcohol, and/or deionized water.

The ionomer dispersion may be applied using a coating device. For example, the coating device may be one or more selected from among a bar-coating device, a comma coating device, a gravure coating device, a slot-die coating device, a screen printing device and a spray coating device.

The thickness of the ionomer dispersion that is applied on the substrate film may preferably be about 20 μm to 500 μm. When the thickness thereof is less than about 20 μm, the first ionomer layer may be hardly formed, or may not be impregnated as desired when stacking the porous reinforced film. On the other hand, when the thickness thereof is greater than about 500 μm, the applied ionomer layer may not maintain its shape, and may flow on the substrate film.

The porous reinforced film may include a polymer film having a large number of pores therein, and must be chemically stable enough to avoid being deformed by a solvent contained in the ionomer dispersion and mechanically stable enough to support the entire membrane-electrode assembly. The porous reinforced film may preferably be a film including one or more polymers selected from among polytetrafluoroethylene, polyethylene terephthalate, polybutylene terephthalate, polytrimethylene terephthalate, polyethylene naphthalate, polymethylpentene, polybenzoxazole, polyethylene, polypropylene and polyimide.

The porosity of the porous reinforced film may preferably be about 50% to 95%. When the porosity thereof is less than about 50%, the amount of the ionomer that is impregnated into the porous reinforced film may decrease, and thus the proton-conducting paths may decrease, thereby increasing the ionic resistance of the electrolyte membrane, undesirably deteriorating the performance of the fuel cell. On the other hand, when the porosity thereof is greater than about 95%, the effect of increasing the mechanical strength of the electrolyte membrane may become insignificant. Preferably, the porosity of the porous reinforced film may be 70% to 90%.

The thickness of the porous reinforced film may suitably be about 1 μm to 20 μm. When the thickness of the porous reinforced film is less than about 1 μm, the effect of increasing the mechanical strength of the electrolyte membrane may become insignificant. On the other hand, when the thickness thereof is greater than about 20 μm, it is difficult to sufficiently impregnate the ionomer into the porous reinforced film, and thus the ionic resistance of the electrolyte membrane may increase. Preferably, the thickness of the porous reinforced film may be about 3 μm to 15 μm.

The ionomer dispersion may be applied on the substrate film and the porous reinforced film may be stacked thereon, whereby some of the ionomer dispersion may be impregnated into the pores in the porous reinforced film, and the remainder thereof may be left behind on the surface of the porous reinforced film to form an ionomer layer. The ionomer dispersion may include an ionomer and a solvent.

The stacking process is not particularly limited, and in the present invention, for example, a roll-laminating process may be performed.

After stacking of the porous reinforced film, an ionomer layer (a first ionomer layer) may be formed on the porous reinforced film.

Formation of Second Ionomer Layer

A second ionomer layer, which is another ionomer layer, may be formed on the surface of the porous reinforced film opposite the surface on which the first ionomer layer is formed. Particularly, an ionomer dispersion may also be applied on the surface of the porous reinforced film opposite the surface on which the first ionomer layer is formed, thus forming a second ionomer layer. Here, the ionomer dispersion fundamentally may include an ionomer and a solvent, and the ionomer and the solvent may be the same as those that are used when forming the first ionomer layer.

The ionomer dispersion may be applied using a coating device. The coating device may be one selected from among a bar coating device, a comma coating device, a gravure coating device, a slot-die coating device, a screen printing device, and a spray coating device. Preferably, a slot-die coating device may be used.

The thickness of the ionomer dispersion that is applied on the porous reinforced film may preferably be about 20 μm to 500 μm. When the thickness thereof is less than about 20 μm, the second ionomer layer may hardly be formed, and thus the proton-conducting paths may decrease, and long-term stability may deteriorate due to weakened interfacial adhesion to the electrode. On the other hand, when the thickness thereof is greater than about 500 μm, the applied ionomer layer does not maintain its shape, and may flow on the porous reinforced film.

Some of the ionomer included in the second ionomer layer thus formed may be impregnated into the pores in the porous reinforced film. Preferably, the ionomer contained in the first ionomer layer and the ionomer contained in the second ionomer layer may be brought into contact with each other within pores in the porous reinforced film to form a proton-conducting paths.

The ionomer layer may further include a voltage reversal tolerance-increasing additive, in addition to the ionomer. The voltage reversal tolerance-increasing additive may be included in at least one of the first ionomer layer and the second ionomer layer, which may be freely selected depending on the processing sequence and the manufacturing purpose.

The voltage reversal tolerance-increasing additive may include a water electrolysis catalyst and an electrical conductor.

The voltage reversal tolerance-increasing additive may be added to the ionomer dispersion, mixed and then applied, or alternatively, may be mixed with an ionomer dispersion, separately from the above ionomer dispersion, and may then be independently applied.

The water electrolysis catalyst and the electrical conductor may be independently added to the ionomer dispersion, but as necessary, the water electrolysis catalyst may be added in the form of being supported on the electrical conductor.

The water electrolysis catalyst may preferably include a metal particle or metal oxide including one or more selected from the group consisting of ruthenium (Ru), iridium (Ir), chromium (Cr), manganese (Mn), iron (Fe), cobalt (Co), nickel (Ni), copper (Cu), molybdenum (Mo), and yttrium (Y).

The electrical conductor preferably may include one or more selected from the group consisting of carbon nanotubes, carbon nanofibers, carbon nanowires, and carbon black, and particularly may include one or more selected from the group consisting of carbon nanotubes, carbon nanofibers, and carbon nanowires.

The voltage reversal tolerance-increasing additive may be included in all or part of the ionomer layers (e.g., the first ionomer layer and/or the second ionomer layer).

The amount of the voltage reversal tolerance-increasing additive may preferably be about 5 parts by weight to 60 parts by weight based on 100 parts by weight of the total amount of the ionomer.

The voltage reversal tolerance-increasing additive may preferably not be impregnated into pores in the porous reinforced film, and the voltage reversal tolerance-increasing additive preferably may remain on the surface of the porous reinforced film because problems may occur when electrons or the like move through the electrolyte membrane including the porous reinforced film.

Drying

The porous reinforced film and the first and second ionomer layers formed on opposite surfaces of the porous reinforced film may be dried.

The drying may preferably be performed at a temperature of about 40° C. to 200° C. When the drying temperature is less than 40° C., the drying time may excessively increase, which may increase the processing cycle time. On the other hand, when the drying temperature is greater than about 200° C., the degree of crystallinity may increase, and thus interfacial adhesion to the electrode may be weakened, and moreover, thermal degradation of the ionomer and deformation of the porous reinforced film may excessively occur, severely deteriorating the quality of the electrolyte membrane. More preferably, the drying may be performed at a temperature of about 80° C. to 160° C. In some cases, the drying process may be performed step by step in different temperature ranges, and preferably, the drying process may be performed in two steps. For example, the electrolyte membrane may be primarily dried at a temperature of about 40° C. to 100° C. and then secondarily dried at a temperature of about 140° C. to 200° C.

Because the solvent contained in the first ionomer layer and the second ionomer layer may be removed by the drying, the thickness of the first ionomer layer and the second ionomer layer may be reduced.

The reduction rate of thickness of the ionomer layer may vary depending on the amounts of the ionomer and the voltage reversal tolerance-increasing additive that are present in the ionomer dispersion or on the type of solvent.

The thickness of the dried ionomer layer may be about 3 to 50 μm.

Polymer Electrolyte Membrane

The polymer electrolyte membrane for a fuel cell may include a porous reinforced film and an ionomer layer formed on each of opposite surfaces of the porous reinforced film, the ionomer layer including an ionomer and a voltage reversal tolerance-increasing additive including a water electrolysis catalyst and an electrical conductor.

FIG. 2 shows the cross-sectional structure of the polymer electrolyte membrane according to an exemplary embodiment of the present invention. The polymer electrolyte membrane may include an ionomer-impregnated porous reinforced film layer B and an ionomer layer A formed on each of opposite surfaces of the porous reinforced film B, in which some of the ionomer layer A includes a region C in which the voltage reversal tolerance-increasing additive is provided.

Particularly, the voltage reversal tolerance-increasing additive may include a water electrolysis catalyst 10 and an electrical conductor 20. The water electrolysis catalyst 10 and the electrical conductor 20 may remain on the surface of the porous reinforced film 40 and may thus be contained in the ionomer layer, but may not be impregnated into the porous reinforced film 40.

The amount of the voltage reversal tolerance-increasing additive may preferably be about 5 parts by weight to 60 parts by weight based on 100 parts by weight of the total amount of the ionomer.

The amount of the water electrolysis catalyst 10 may preferably be about 0.05 parts by weight to 10 parts by weight based on 100 parts by weight of the total amount of the ionomer, and the amount of the electrical conductor 20 may preferably be about 5 parts by weight to 50 parts by weight based on 100 parts by weight of the total amount of the ionomer.

The thickness of the ionomer layer may be less than the thickness of the ionomer dispersion that may be applied in the step of forming the first ionomer layer or forming the second ionomer layer. This may be influenced by drying and incorporation processes, and the thickness of the ionomer layer may preferably be about 3 μm to 50 μm.

The ionomer layer may be divided into a region including a voltage reversal tolerance-increasing additive and a region not including the voltage reversal tolerance-increasing additive. The ionomer layer including the voltage reversal tolerance-increasing additive may have a through-plane electrical resistivity of less than about 10 Ω·m at a compressive pressure of about 0.5 MPa. The ionomer layer not including the voltage reversal tolerance-increasing additive may have a through-plane electrical resistivity of about 10 Ω·m or greater at a compressive pressure of about 0.5 MPa. The through-plane electrical resistivity of the ionomer layer including the voltage reversal tolerance-increasing additive may be less than about 5 Ω·m. When the through-plane electrical resistivity of the ionomer layer including the voltage reversal tolerance-increasing additive is about 10 Ω·m or greater, electrons generated in the water electrolysis catalyst cannot be efficiently moved to the anode, and thus the effect of increasing voltage reversal tolerance may become insignificant.

Method of Manufacturing Membrane-Electrode Assembly

In another aspect, provided herein is a method of manufacturing a membrane-electrode assembly for a fuel cell includes preparing the polymer electrolyte membrane described herein and providing an anode and a cathode on respective surfaces of the polymer electrolyte membrane.

The electrolyte membrane may include a reinforced film and ionomer layers formed on opposite surfaces of the reinforced film. Either of the ionomer layers may preferably include a voltage reversal tolerance-increasing additive.

When the membrane-electrode assembly is manufactured by bonding the anode and the cathode on the electrolyte membrane, the anode may be provided and bonded on the ionomer layer including the voltage reversal tolerance-increasing additive.

Membrane-Electrode Assembly

The membrane-electrode assembly for a fuel cell may include an electrolyte membrane and electrodes provided on opposite surfaces of the electrolyte membrane.

The electrodes may preferably include an anode and a cathode, and respective electrodes may be provided on opposite surfaces of the electrolyte membrane.

The anode and the cathode are not particularly limited, and any examples thereof may be used, so long as they are electrode configurations useful in the fields of fuel cells. At the anode, an oxidation reaction that oxidizes hydrogen introduced from the outside has to be able to occur, and at the cathode, a reduction reaction in which oxygen introduced from the outside reacts with the protons and electrons transferred from the anode has to be able to occur.

The electrolyte membrane may include a reinforced film and ionomer layers provided on opposite surfaces of the reinforced film, in which either of the ionomer layers includes a voltage reversal tolerance-increasing additive.

A the ionomer layers included in the electrolyte membrane, the ionomer layer not including the voltage reversal tolerance-increasing additive may be in contact with the cathode, and the ionomer layer including the voltage reversal tolerance-increasing additive may be in contact with the anode.

The water electrolysis catalyst of the voltage reversal tolerance-increasing additive included in the electrolyte membrane may be electrically connected by the electrical conductor to the electrode formed on the same surface, among the two surfaces of the electrolyte membrane, but is not electrically connected to the electrode formed on the opposite surface.

Fuel Cell

The fuel cell of the present invention may include unit cells each including a membrane-electrode assembly including the electrolyte membrane of the present invention and a subgasket bonded to both sides of the membrane-electrode assembly, the unit cells being stacked.

The subgasket may include an opening in the center, and the subgasket may be provided and bonded to both sides of the membrane-electrode assembly to thus fix the membrane-electrode assembly. The surface of the subgasket exposed to the outside may be a non-reaction region in which the reaction does not proceed, and the surface exposed to the outside through the opening in the subgasket may be a reaction region in which the reaction proceeds.

The reaction region is a region of the ionomer layer of the membrane-electrode assembly that is not bonded by the subgasket.

FIG. 3A-3D schematically show the reaction region including an exemplary ionomer layer and the region in which the voltage reversal tolerance-increasing additive included in the ionomer layer is distributed. The reaction region, the non-reaction region and a voltage reversal tolerance-increasing additive distribution region are shown.

Figure 3A:
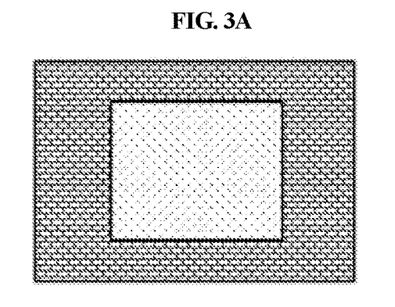
FIG. 3A to 3D show regions in which a voltage reversal tolerance-increasing additive is distributed in the ionomer layer.
Figure 3B:
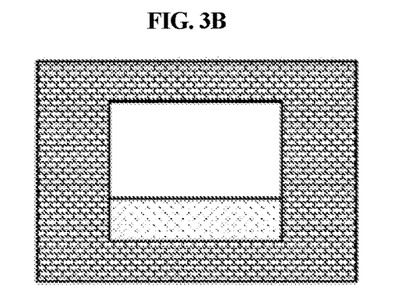
Figure 3C:
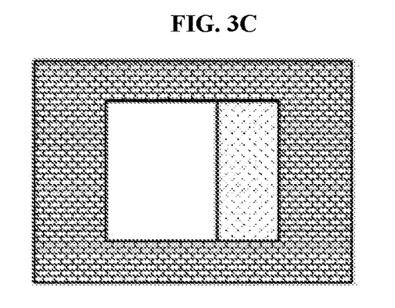
Figure 3D:
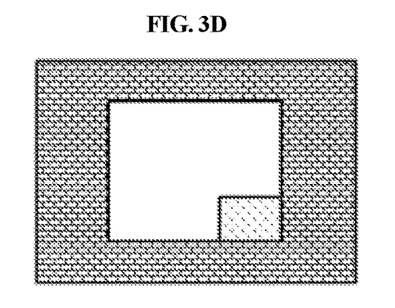

The voltage reversal tolerance-increasing additive may be formed on all or part of the ionomer layer. In FIG. 3A, the voltage reversal tolerance-increasing additive is distributed throughout the ionomer layer, and in FIG. 3B, the voltage reversal tolerance-increasing additive is distributed at the lower portion of the ionomer layer. Also, the voltage reversal tolerance-increasing additive is distributed only in the right side of the ionomer layer in FIG. 3C), and moreover, when the range in which voltage reversal mainly occurs is small, the voltage reversal tolerance-increasing additive may be distributed only in a local area, as shown in FIG. 3D.

The voltage reversal tolerance-increasing additive distribution region may be changed because the region in which voltage reversal occurs varies depending on the membrane-electrode assembly and the stack structure or the configuration thereof. When the region in which voltage reversal occurs is irregular, it is preferable that the voltage reversal tolerance-increasing additive be located in the entire region of the ionomer layer, as shown in FIG. 3A.

EXAMPLE

A better understanding of the present invention will be given through the following examples. However, these examples are merely set forth to illustrate the present invention, and are not to be construed as limiting the scope of the present invention.

Example 1

A perfluorinated sulfonic acid-based ionomer, iridium oxide ($IrO_2$) and carbon nanotubes were added to a solvent, sufficiently stirred at room temperature using a stirrer and then sonicated, thus preparing an ionomer dispersion. The amounts of iridium oxide and carbon nanotubes that were added were 5 parts by weight and 10 parts by weight, respectively, based on 100 parts by weight of the perfluorinated sulfonic acid-based ionomer. Thereafter, the ionomer dispersion was applied to a thickness of 300 μm on a PTFE film using a bar coating device, primarily dried at a temperature of about 80° C. and then secondarily dried at a temperature of 160° C., thereby forming an ionomer layer.

Example 2

A perfluorinated sulfonic acid-based ionomer was added to a solvent, sufficiently stirred at room temperature using a stirrer, and then sonicated, thus preparing a first ionomer dispersion. The first ionomer dispersion was applied to a thickness of about 150 μm on a PTFE film using a bar coating device, and a PTFE reinforced film having an average thickness of about 5 μm and average porosity of 60% was stacked on the first ionomer dispersion so that the first ionomer dispersion was impregnated therein. The ionomer dispersion (a second ionomer dispersion) used in Example 1 including iridium oxide and carbon nanotubes was applied to a thickness of about 150 μm on the first ionomer dispersion-impregnated PTFE reinforced film using a bar coating device, primarily dried at a temperature of about 80° C., and then secondarily dried at a temperature of about 160° C., thereby manufacturing a polymer electrolyte membrane in which the voltage reversal tolerance-increasing additive was included in the second ionomer layer.

Comparative Examples 1 and 2

Ionomer layers were formed in the same manner as in Example 1, with the exception that the amounts of the materials that are added were adjusted as shown in Table 1 below. Here, the ionomer, the water electrolysis catalyst and the electrical conductor that were used were the same products as in Example 1.

TABLE 1

|  | Ionomer (parts by weight) | Water electrolysis catalyst (parts by weight) | Electrical conductor (parts by weight) |
| --- | --- | --- | --- |
| Example 1 | 100 | 5 | 10 |
| Comparative Example 1 | 100 | 0 | 0 |
| Comparative Example 2 | 100 | 5 | 0 |

Comparative Examples 3 and 4

Polymer electrolyte membranes were manufactured in the same manner as in Example 2, with the exception that the ionomer dispersion used in Comparative Example 1 and Comparative Example 2 was used as the second ionomer dispersion. Here, the first ionomer dispersion, the water electrolysis catalyst and the electrical conductor that were used were the same products as in Example 2.

Test Example 1

The ionomer layer manufactured in each of Example 1, Comparative Example 1 and Comparative Example 2 was separated from the PTFE film, and the through-plane electrical resistivity thereof was measured using a measurement device (model: CPRT Tester, LCDV CO.). Three specimens of each of the above Example and Comparative Examples were manufactured to measure the resistivity values, and the average values thereof are shown in Table 2 below.

TABLE 2

|  | Example 1 | Comparative Example 1 | Comparative Example 2 |
| --- | --- | --- | --- |
| Resistivity ($\Omega \cdot m$) | 1.6 | $3.5 \times 10^7$ | 29 |

Test Example 2

The polymer electrolyte membrane manufactured in Example 2 was separated from the PTFE film, and the electrical resistivity thereof was measured in the same manner as in Test Example 1. The through-plane electrical resistivity of the polymer electrolyte membrane was $5.9 \times 10^5$ Ω·m, indicating electrical non-conductor properties, confirming that the polymer electrolyte membrane according to an exemplary embodiment of the present invention can operate normally without an electrical short circuit.

Test Example 3

Figure 4:
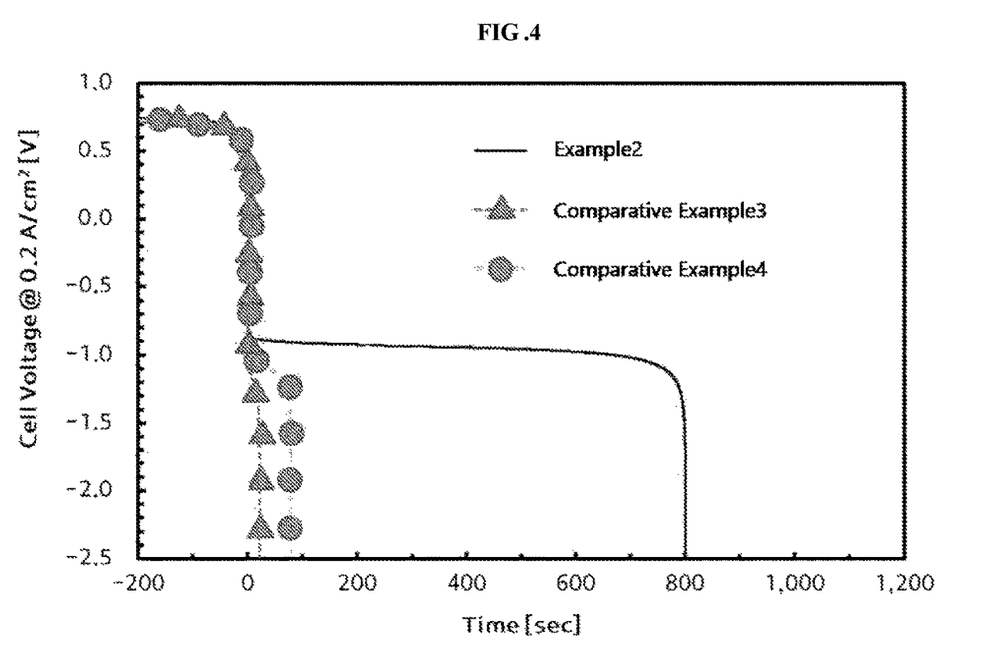
FIG. 4 shows the voltage reversal behavior of an exemplary polymer electrolyte membrane for a fuel cell according to an exemplary embodiment of the present invention.

After the membrane-electrode assemblies were manufactured using the polymer electrolyte membranes manufactured in Example 2, Comparative Example 3 and Comparative Example 4, the voltage reversal behavior thereof was evaluated. As conditions for evaluating the voltage reversal behavior, the cell temperature was set to a temperature of 65° C. and the relative humidity was set to 50% for the anode and the cathode. FIG. 4 shows the results of simulation of cell voltage behavior under hydrogen starvation conditions by completely blocking hydrogen supply to the anode of the fuel cell under the above conditions and supplying nitrogen gas instead. As shown in FIG. 4, when using the polymer electrolyte membranes manufactured in Comparative Example 3 and Comparative Example 4, the time during which the fuel cell operated normally was very short, and thus, even at low current density of 0.2 A/cm², the cell voltage rapidly decreased to less than 0 V after only a few seconds, resulting in voltage reversal. After about 20 sec (Comparative Example 3) or about 80 sec (Comparative Example 4), the cell voltage rapidly decreased to about −2.5 V. On the other hand, the polymer electrolyte membranes manufactured in Examples 2 were maintained for about 800 sec at about −1.0 V, indicating that voltage reversal tolerance was greatly improved.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A polymer electrolyte membrane for a fuel cell, comprising:
    a porous reinforced film; and
    ionomer layers provided on each of opposite surfaces of the porous reinforced film,
    wherein the ionomer layers comprises an ionomer and at least a portion of the ionomer layers comprising a voltage reversal tolerance-increasing additive that comprises 1) a water electrolysis catalyst and 2) an electrical conductor,
    wherein an amount of the water electrolysis catalyst is about 0.05 parts by weight to 10 parts by weight based on 100 parts by weight of the total amount of the ionomer, and
    an amount of the electrical conductor is about 5 parts by weight to 50 parts by weight based on 100 parts by weight of the total amount of the ionomer.

2. The polymer electrolyte membrane of claim 1, wherein the porous reinforced film has a porosity of about 50% to 95%.

3. The polymer electrolyte membrane of claim 1, wherein the porous reinforced film has a thickness of about 1 μm to 20 μm.

4. The polymer electrolyte membrane of claim 1, wherein each of the ionomer layers has a thickness of about 3 μm to 50 μm.

5. The polymer electrolyte membrane of claim 1, wherein the voltage reversal tolerance-increasing additive is contained in the portion of the ionomer layers provided on either of the opposite surfaces of the porous reinforced film.

6. The polymer electrolyte membrane of claim 1, wherein the water electrolysis catalyst is a metal particle or metal oxide comprising one or more selected from the group consisting of ruthenium (Ru), iridium (Ir), chromium (Cr), manganese (Mn), iron (Fe), cobalt (Co), nickel (Ni), copper (Cu), molybdenum (Mo), and yttrium (Y).

7. The polymer electrolyte membrane of claim 1, wherein the electrical conductor comprises one or more selected from the group consisting of carbon nanotubes, carbon nanofibers, carbon nanowires, and carbon black.

8. The polymer electrolyte membrane of claim 1, wherein the ionomer layers comprise:
    a first ionomer layer formed on a first surface of the porous reinforced film, and
    a second ionomer layer formed on a second surface of the porous reinforced film.

9. The polymer electrolyte membrane of claim 1, wherein the portion of the ionomer layers comprising the voltage reversal tolerance-increasing additive has a through-plane electrical resistivity of less than about 10 Ω·m at a compressive pressure of about 0.5 MPa, and
    the other portion of the ionomer layers not comprising the voltage reversal tolerance-increasing additive has a through-plane electrical resistivity of about 10 Ω·m or greater at a compressive pressure of about 0.5 Mpa.

10. A method of manufacturing a membrane-electrode assembly for a fuel cell, comprising:
    preparing a polymer electrolyte membrane of claim 1; and
    providing an anode and a cathode on respective surfaces of the polymer electrolyte membrane,
    wherein the anode is provided and bonded on the portion of the ionomer layers comprising the voltage reversal tolerance-increasing additive.

11. A membrane-electrode assembly for a fuel cell manufactured by the method of claim 10,
    wherein the other portion of the ionomer layers not comprising the voltage reversal tolerance-increasing additive is in contact with a cathode, and
    the portion of the ionomer layers comprising the voltage reversal tolerance-increasing additive is in contact with an anode.

12. A fuel cell comprising a membrane-electrode assembly of claim 11.

13. A method of manufacturing a polymer electrolyte membrane for a fuel cell, comprising:
    forming a first ionomer layer on one surface of a porous reinforced film;
    forming a second ionomer layer on a remaining surface of the porous reinforced film; and
    performing drying,
    each of the first ionomer layer and the second ionomer layer comprise an ionomer and a voltage reversal tolerance-increasing additive comprising a water electrolysis catalyst and an electrical conductor, wherein an amount of the water electrolysis catalyst is about 0.05 parts by weight to 10 parts by weight based on 100 parts by weight of the total amount of the ionomer, and an amount of the electrical conductor is about 5 parts by weight to 50 parts by weight based on 100 parts by weight of the total amount of the ionomer.

14. The method of claim 13, wherein the voltage reversal tolerance-increasing additive is contained in all or part of the first ionomer layer and/or the second ionomer layer.

15. The method of claim 13, wherein the drying is performed at a temperature of about 40 C to 200 C.

* * * * *